United States Patent [19]
Becze
[11] Patent Number: 4,834,263
[45] Date of Patent: May 30, 1989

[54] TAMPER RESISTANT APPARATUS FOR DISPENSING PACKAGED PRODUCTS

[76] Inventor: Thomas Becze, 45 Sycamore Dr., Lawrenceville, N.J. 08648

[21] Appl. No.: 181,903
[22] Filed: Apr. 15, 1988

Related U.S. Application Data

[63] Continuation-in-part of Ser. No. 904,713, Sep. 5, 1986, abandoned.

[51] Int. Cl.[4] B65G 59/06
[52] U.S. Cl. 221/1; 221/31; 221/154; 221/195; 221/197; 221/282; 221/298
[58] Field of Search 222/325; 221/30, 31, 221/191, 193-195, 197, 154, 297-301, 282, 283, 1

[56] References Cited

U.S. PATENT DOCUMENTS

| | | | |
|---|---|---|---|
| 630,661 | 8/1899 | Cody | 221/197 |
| 931,151 | 2/1909 | Neher | 221/197 |
| 953,739 | 4/1910 | Duncombe | 221/301 |
| 1,120,500 | 12/1914 | Hughes | 221/197 |
| 2,956,660 | 10/1960 | Nordquist | 221/301 |
| 3,078,008 | 2/1963 | MacDonald | 221/31 |
| 3,486,658 | 12/1969 | Cheslak et al. | 221/197 |
| 4,345,627 | 8/1982 | Cassia | 222/325 |

FOREIGN PATENT DOCUMENTS

| | | | |
|---|---|---|---|
| 34764 | 7/1925 | Denmark | 221/283 |

*Primary Examiner*—H. Grant Skaggs
*Attorney, Agent, or Firm*—Robert E. Burns; Emmanuel J. Lobato

[57] ABSTRACT

A method of dispensing ingestible units such as capsules, tablets and pills in such manner as to avoid tampering or adulteration comprises packaging such units in sealable containers, sealing the containers, and loading the sealed containers into a magazine at the factory where the units are produced. The sealed magazine is transported to the place of sale where it is inserted, while still sealed, into the housing of dispensing apparatus having an opening for introducing the magazine, a closure for the opening and a lock for securing the closure. Moreover, the apparatus includes blades for breaking the seal of the magazine when inserted to release the containers and mechanism for sequentially dispensing the containers in such manner as to prevent their reinsertion into the apparatus.

12 Claims, 3 Drawing Sheets

FIG. 3
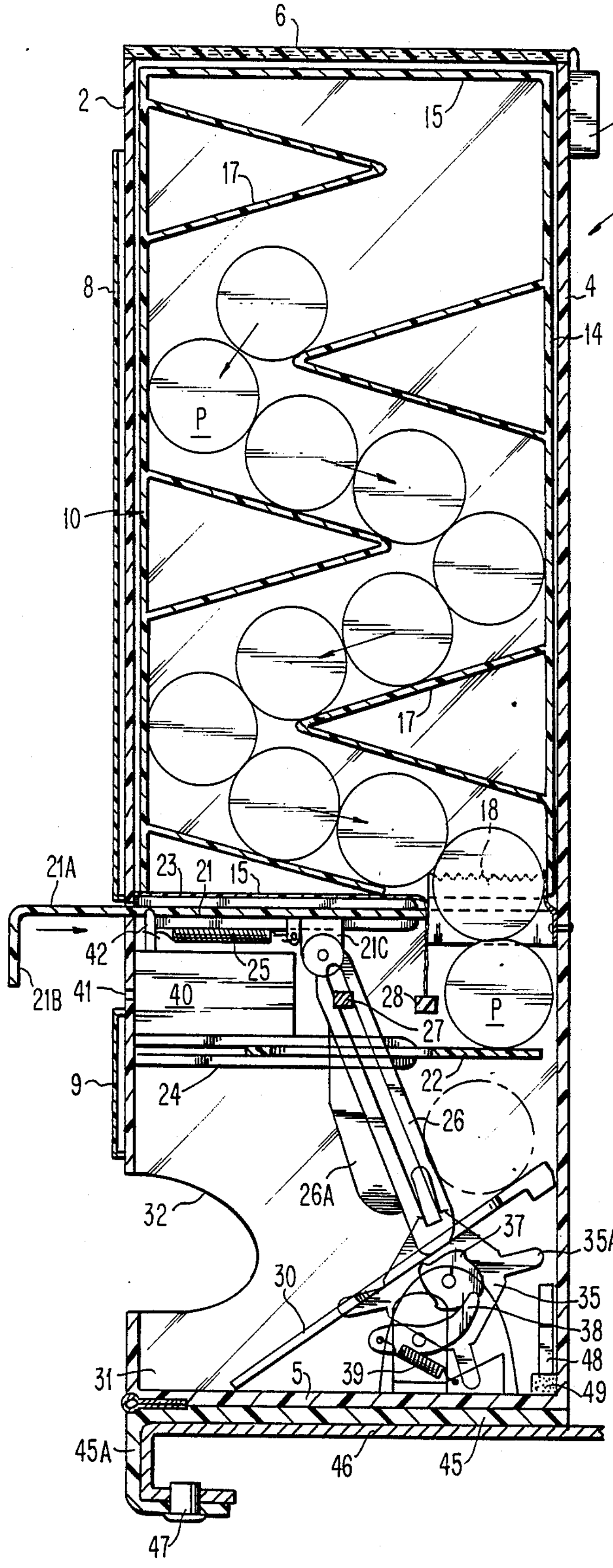
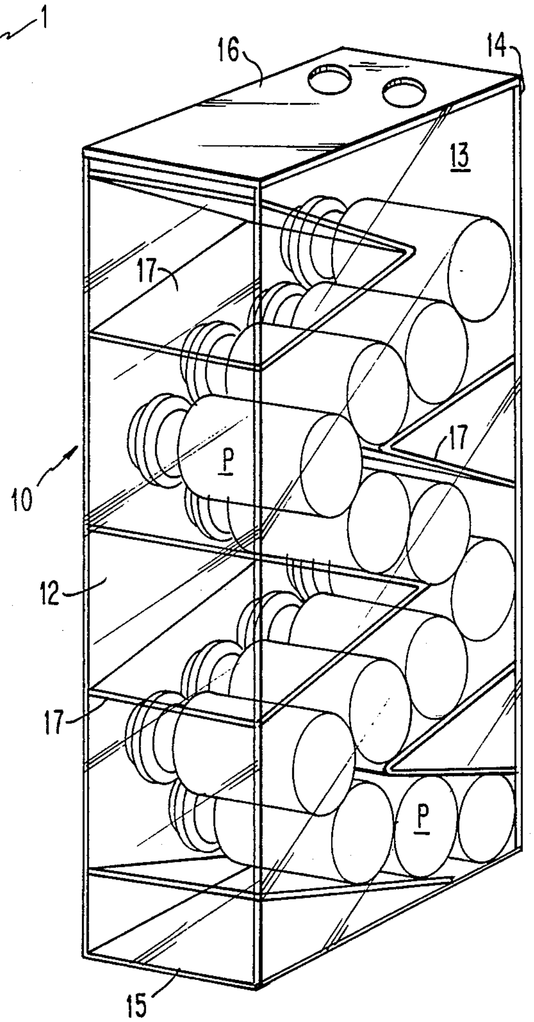
FIG. 4

TAMPER RESISTANT APPARATUS FOR DISPENSING PACKAGED PRODUCTS

This is a continuation-in-part of application Ser. No. 904,713, filed Sept. 5, 1986 and now abandoned.

The present invention relates to apparatus for dispensing packaged over-the-counter products such as drugs and food products at establishments where such products are sold to consumers and in particular to dispensing apparatus in which the products are protected from tampering.

BACKGROUND OF THE INVENTION

In recent years, a number of consumers have been poisoned by ingesting capsules of well-known pain-killers which they had purchased off the shelf at retail stores. Packages containing these capsules had apparently been removed from the stores, the capsules laced with poison and the packages then returned to the shelves of the stores. Unsuspecting consumers purchased these tampered packaged products and were killed by the contaminated capsules.

These occurrences have engendered much fear throughout the country, fear caused in part by the awareness that anyone can be random victim of poisoning in this matter. This is especially true in view of the large number of products sold off the shelf and the difficulty of detecting tampered packages.

In an endeavor to protect the consumers, manufacturers have introduced tamper-resistant packaging such as triple seal packages. These packages include an interior foil seal placed over the opening of the container. They also include a plastic band which seals the lid to the container. Moreover, the containers are encased in a plastic wrapper or placed in an exterior cardboard box which is sealed with plastic film or other wrapping material.

Not only are these packaging methods relatively expensive, but they have proved ineffective. Despite the use of tamper-resistant packaging, there have been further instances of poisoning by packaged drug products.

SUMMARY OF THE INVENTION

The present invention relates to apparatus for dispensing packaged products, in particular drug products, in such manner as to prevent tampered off-the-shelf products reaching the hands of a consumer. In accordance with the invention, there is provided tamper-resistant dispensing apparatus from which packaged over-the-counter products are delivered to consumers. The apparatus includes a container for storing a supply of the packages to be dispensed, the container being sealed in such manner as to prevent the introduction of any product by an authorized person. Moreover, the apparatus includes means for preventing a person from withdrawing a package from the dispenser, tampering with the contents of the package and reintroducing the package into the dispenser. Moreover, the dispenser is secured to a shelf or other support in such manner that it cannot be removed by an unauthorized person to another location for tampering and then returned to its original location.

In accordance with the preferred embodiment of the invention, the apparatus includes a housing in which is inserted a magazine or cartridge which has been filled with packaged products at the factory and then sealed. The seal remains intact until the magazine is inserted in the housing of the dispenser. The magazine insert may be returned to the factory for refilling and resealing or, if made sufficiently inexpensively, may be a single use container.

Once a package has been delivered by the dispenser, it cannot be reintroduced either through the delivery passage or otherwise. To prevent irresponsible operation of the dispenser, by a person not intending to purchase the product, the dispenser may be provided with safety means, for example means requiring the insertion of an element such as a coin, token or card in order to operate the apparatus to dispense a package.

BRIEF DESCRIPTION OF DRAWINGS

The nature, objects and advantages of the invention will be more fully understood from the following description of a preferred embodiment shown by way of example in the accompanying drawings in which:

FIG. 3 is a vertical section taken approximately on the line 3—3 in FIG. 2 and, FIG. 4 is a perspective view of a magazine prior to insertion into the dispenser.

DESCRIPTION OF PREFERRED EMBODIMENT

Figure 1:
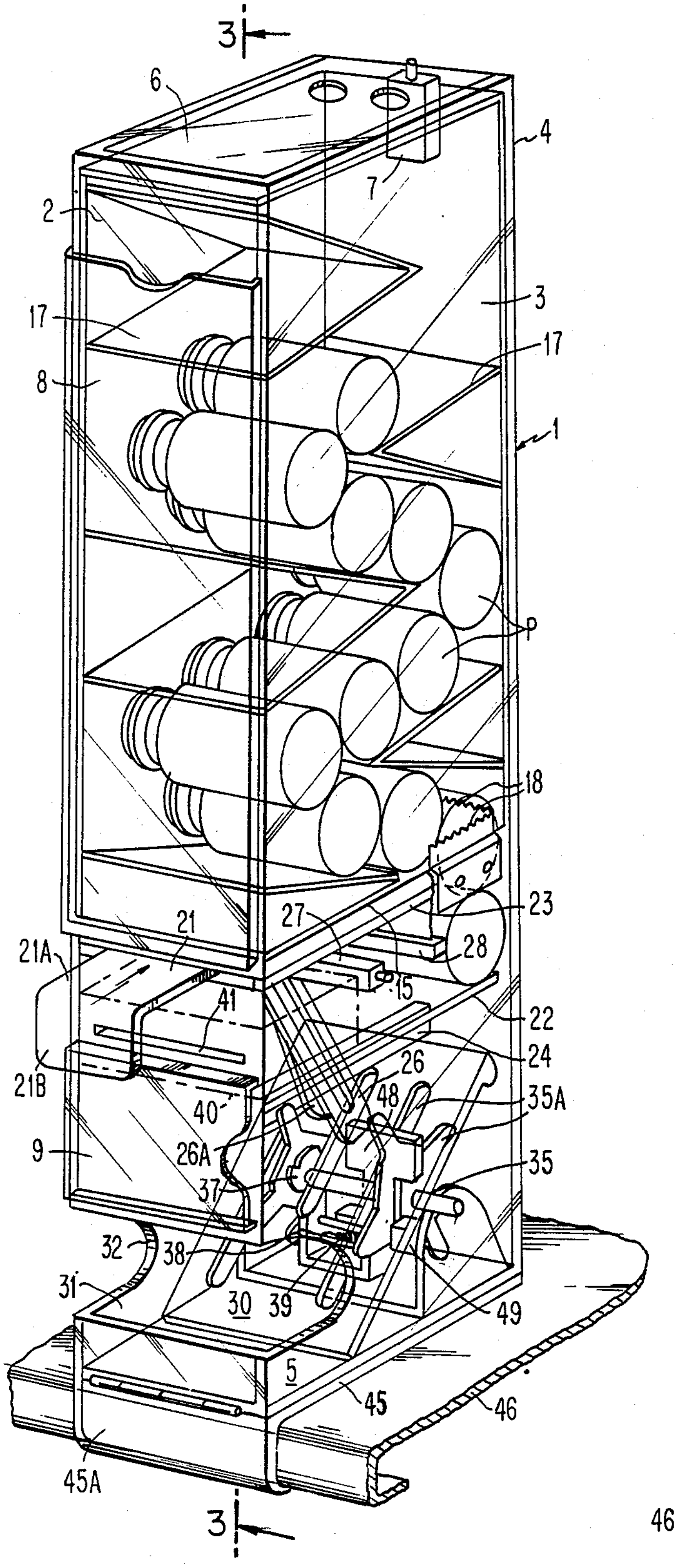
FIG. 1 is a front perspective view of the dispensing apparatus in accordance with the invention shown mounted on a shelf.

Dispensing apparatus shown by way of example in FIGS. 1 to 4 of the drawings comprises a housing 1 having a front wall 2, side walls 3, a back wall 4 and a bottom 5. The upper end of the housing is open and is closable by sliding top 6 which is secured in closed position by a lock 7. The entire housing is preferably formed of clear plastic material such as Plexiglas, a methyl acroylate plastic, the several parts of the housing being suitably joined, for example by means of screws, by welding, or by injection molding. On the front wall of the housing, there are thinner pannels 8 and 9 which are spaced slightly from the front wall in order to receive printed material, for example material describing the product and giving directions for its use.

Figure 6:
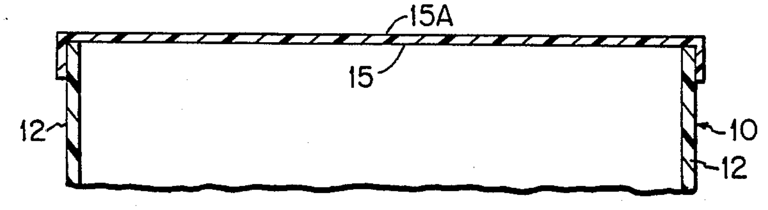
FIG. 6 is a partial vertical section of a magazine.

In an upper part of the housing, there is a magazine containing a supply of the packaged product that is to be dispensed. As illustrated in the drawings, the magazine is a separate insertably unit comprising a cartridge 10 having a front wall 12, side walls 13, rear wall 14 and a top 16 which is integral with the walls. The bottom of the magazine is closed by plastic film 15 which is sealed onto the walls of the magazine, for example by adhesive or heat-sealing. A harder plastic cover 15A is welded on over the plastic film 15 as illustrated in FIG. 6. V-shaped baffles 17 projecting inwardly from front and back walls of the magazine define a zig-zag storage space in which packages of the product, for example in the form of plastic bottles, are accommodated. The walls, top and baffles of the magazine are preferably formed of clear plastic material while the bottom 15 comprises a plastic film which is preferably backed with metal foil.

The magazine 10 is adapted to be filled and sealed at the factory where the product is produced and is shipped to retail stores or other points of sale in sealed condition. At the point of sale the hard cover 15A is removed from the magazine with a suitable tool, leaving the plastic film 15 intact. With the sliding top 6 of the housing 1 open, the magazine is inserted in the housing to the position shown in FIG. 3, whereupon the sliding top is closed and locked in place. As the magazine approaches its final position in the housing, the plastic film forming the bottom of the magazine is ruptured along the rear wall and the rear portions of the side walls by knife blades 18 which are secured on inner surfaces of the rear and side walls of the housing and are slightly off-set inwardly so as to engage the plastic film just inside the rear wall and the side walls of the magazine. The upper edges of the knife blades are preferably serrated to facilitate their penetration of the plastic film. With the seal thus broken, there is formed an opening through which the packages can be discharged from the magazine.

Sequential discharge of packages from the magazine 10 is controlled by dispensing mechanism comprising an upper slidable door 21 and a lower slidable door 22 which are spaced one above the other a distance slightly greater than the diameter or width of the packages to be dispensed and are guided for fore-and-aft movement by guides 23 and 24 respectively provided on inner faces of the side walls of the housing. The upper slidable door 21 is biased forwardly to open position by a coil spring 25.

A portion 21A of the upper slidable door 21 extends out through a slot in the front wall 2 of the housing and is bent down to form a handle portion 21B by means of which the door 21 can be moved rearwardly to closed position against the tension of the spring 25. The lower door 22 is interlinked with the upper slidable door 21 so as to coordinate the movement of the doors in the manner that when door 21 is open, door 22 is closed and, conversely, door 2 is open when door 21 is closed. The means for interlinking the two doors is shown as comprising a lever 26 which at its upper end is pivotally connected to a lug 21C on the lower side of the upper slidable door 21. A bar 27 extending between opposite side walls of the housing passed through an elongate slot in the lever 26 to provide a sliding pivot for the lever. The lever 26 extends through an elongate slot in the slidable door 22 and on its forward side has a cam surface 26A engageable with the forward end of the slot in the lower slidable door 22.

As shown in FIG. 3, the upper slidable door 21 is normally in open position, being held there by the spring 25, and the lower slidable door 22 is normally in closed position. A package P having passed through the open upper door 21 resides in a dwell space between the two doors, being retained between the rear wall of the housing and a bar 28 that extends between the two side walls. If the upper door 21 is now moved rearwardly to closed position by pressing on the handle 21B, the lower door 22 is moved forwardly to open position by engagement of the cam surface 26A of the lever 26 with the forward end of the slot in door 22, thereby allowing the package P to drop down into a delivery passageway provided by an inclined ramp 30. The delivery passageway leads to a delivery station 31 formed by the intersection of the bottom 5 with the front wall 2 of the housing. An opening 32 in the front wall and adjacent portions of the side walls of the housing permits a customer to fit the package from the delivery station. When the handle 21B is released, the upper door 21 is returned by the spring 25 to open position and the lever 26 engages the rear end of the slot in the lower door 22 to move the lower door to closed position, whereupon the next package drops into the dwell space between the doors.

When a package has been removed from the dispenser, it cannot be reintroduced into the housing from the top. Not only is the sliding top 6 secured in closed position by the lock 7, but even if the lock is picked or forced, the integral top of the magazine prevents the entry of any package. If the magazine were to be lifted out of the housing, all of the packages in the magazine would fall out into the housing and would prevent reinsertion of the magazine 10. Thus, the reintroduction of a package into the top of the housing is effectively prevented.

Moreover, means is provided downstream of the lower door 22 for preventing the reintroduction of a package through the opening 32 and up through the delivery passage provided by the ramp 30. Such means comprises the lever 26 which in normal position extends down into the delivery passage as seen in FIG. 3 thereby preventing upward passage of a package.

Means for reintroduction of a package back through the delivery passage further comprises one-way passage means for permitting downward movement of packages from the dwell space to the delivery station but preventing upward movement of packages. Such means is shown as comprising two star wheels 35 rotatable on a shaft 36 which extends between opposite side walls of the housing and is located below the delivery ramp 30. Each of the star wheels has a plurality of radially projecting arms 35A, four such arms being shown. As the star wheels 35 rotate, the arms 35A extend up through slots in the delivery ramp 30. Means is provided for permitting rotation of the star wheels in one direction only, namely in a counter clockwise direction as viewed in FIG. 3. Such means is shown as comprising a rachet wheel 37 integral with each of the star wheels and engaged by a pivoted pawl 38 biased by a tension spring 39. As a package moves down the delivery ramp 30, it engages upwardly projecting arms of the star wheels and causes the star wheels to rotate in a counter clockwise direction as viewed in FIG. 3, thus permitting continued downward movement of the package. If, however, a person seeks to insert a package up through the delivery passage, it encounters upwardly projecting arms of the star wheels and is thereby blocked since the pawls 38 prevent rotation of the star wheels in a clockwise direction as viewed in FIG. 3. Insertion of the packages is thereby prevented.

To avoid indiscriminate operation of the dispensing apparatus by children or by irresponsible persons not intending to make a purchase, means is preferably provided for restricting operation to responsible persons. Such means is shown as a control unit 40 disposed in a forward portion of the housing between the two sliding doors 21 and 22 as seen in FIG. 3. The control unit requires the insertion of an element such as a key, coin, token or card in order to operate the apparatus. By way of example, the control unit 40 is operable by a standard credit card inserted through a slot 41 in the front wall of the housing. A detent element 42 projecting upwardly from the control unit 40 engages in a transverse slot in the upper slidable door 21 to prevent the door from being moved inwardly and thereby preventing operation of the dispensing mechanism. When a standard credit card is inserted into the control unit 40 through the slot 41, the detent 42 is retracted in known manner, for example electromagnetically, to release the dispensing mechanism for operation. The control unit can be of any suitable known type of card-operated mechanism. It will be understood that a credit card is used merely to release the dispensing mechanism and not to register a charge on the card-bearer's account. A package obtained by operation of the dispensing mechanism is taken to a cashier for payment in the usual manner.

As further safety feature, means is provided for securing the dispensing apparatus to a shelf or other support in such manner that it cannot be removed by an unauthorized person. For this purpose, the housing 1 is mounted on a base 45 having a portion 45A which extends down under a forward portion of a shelf 46 and is secured to the shelf by a lock 47. In order to permit insertion of a loaded magazine into the housing and permit removal of an empty magazine, the housing 1 is mounted on the base 45 in such manner as to be tiltable forwardly to a limited extent so that the upper end of the housing is moved out from under a superposed shelf. To permit such tilting, the housing is mounted on the base 45 by a pivot 47 at the lower forward corner of the housing. Forward tilting of the housing is limited by a T-bar 48 which extends up through a slot in the bottom 5 of the housing just inside the rear wall 4. When the housing is tilted forwardly, the cross bar of the "T" engages rubber bumpers 49 on the bottom of the housing to restrain further tilting.

Figure 5:
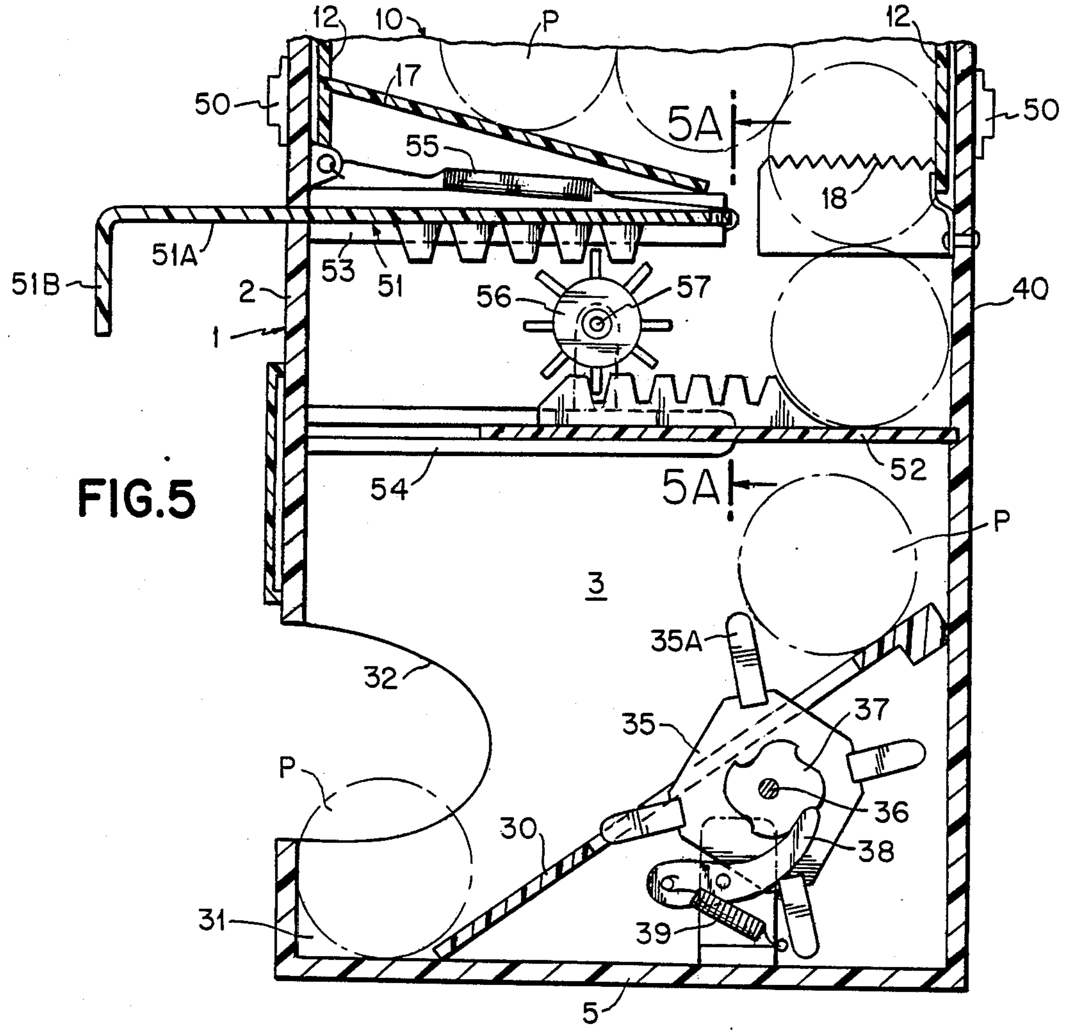
FIG. 5 is a vertical section similar to FIG. 3, but showing the lower part of a modification.
Figure 5A:
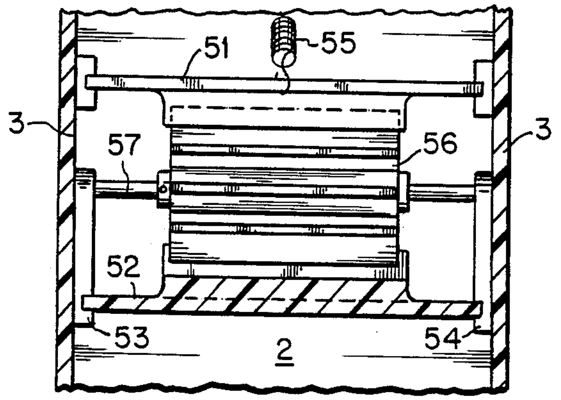
FIG. 5A is a vertical section taken on the line 5A—5A in FIG. 5.

In FIGS. 5 and 5A there is shown a modification of the dispensing apparatus, in which the front wall 2, side walls 3 and back wall 4 of the housing extend only a short distance above the dispensing mechanism. The magazine 10 is mounted on the dispensing apparatus, for example by a sliding connection provided by flanges on lower edges of side walls 13 of the magazine sliding in channels on the inner sides of side walls 3 of the dispensing apparatus, knives being arranged to rupture the plastic film 15 as the magazine is slid into place. A lock secures the magazine to the dispensing apparatus. However as shown by way of example in FIG. 5, the lower end of the magazine 10 fits into the upper end of the housing 1 of the dispensing apparatus, where it is secured by locks 50 having bolts projecting into apertures in the front and back walls of the magazine. Knives 18 rupture the plastic film 15 as the magazine is mounted on the dispensing appartus.

Sequential discharge of packages from the magazine is controlled by dispensing mechanism comprising an upper slidable door or gate 51 and a lower slidable door on gate 52 which are spaced one above the other a distance slightly greater than the diameter or width of the packages to be dispensed and are guided for fore-and-aft movement by guides 53 and 54 respectively provided on inner faces of the side walls of the housing. The upper slidable door 51 is biased forwardly to open position by a spring 55.

A portion 51A of the upper gate extends out through a slot in the front wall 2 of the housing and is bent down to provide a handle portion 51B by means of which the upper gate 51 can be moved rearwardly to closed position against the tension of spring 55. The lower gate 52 is coupled with the upper gate 51 by means of an elongated pinion 56 rotatable about a shaft 57 extending between side walls of the housing and having teeth engaging a rack 51C on the lower side of upper gate 51 and a rack 52C on the upper side of the lower gate 52.

As shown in FIG. 5, the upper slidable gate 51 is normally in open position, being held there by the spring 55, and the lower slidable gate 52 is in closed position. A package P, having passed through the open upper gate, resides in a dwell space between the two gates. If the upper gate 51 is now moved rearwardly to closed position by pressing the handle 51B, the lower gate is moved forwardly to open position by the pinion 56, allowing the package P to drop down into a delivery passage provided by an inclined ramp 30 leading to a delivery station 31, where it is accessible through an opening 32 in the front wall of the housing.

Figure 2:
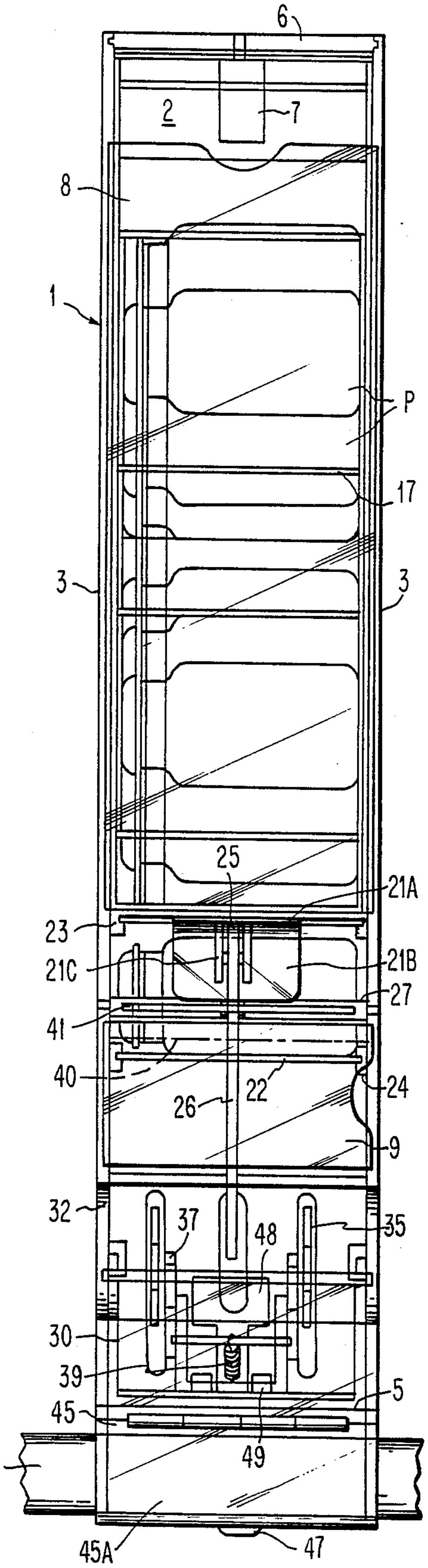
FIG. 2 is a front elevation of the apparatus

Reintroduction of packages into the dispensing apparatus through the delivery passage is prevented by star wheels 35 rotatable on a shaft 36 in one direction only—counter clockwise as view in FIG. 5—by virtue of a rack 37 and spring pressed pawl 38 as in the embodiment shown in FIGS. 1 to 3. Except as otherwise shown and described, the apparatus shown in FIGS. 5 and 5A operates in the same manner as that of FIGS. 1 to 3.

From the foregoing description, it will be seen that the apparatus of the present invention implements a method of dispensing ingestible units such as capsules, tablets and pills which comprises packaging selected quantities of such units in sealable containers, sealing the containers and introducing a selected number of the sealed containers into a sealable magazine which is thereupon sealed at the factory where the units are produced. The sealed magazine is transported to the place of sale, e.g., a retail store, where it is inserted, while still in sealed condition, into dispensing apparatus having an inlet for introducing the magazine, means for closing the inlet and means for securing the closure against unauthorized opening. Moreover, the apparatus includes means for breaking the seal of the magazine when inserted into the housing of the apparatus in order to release the containers and means for sequentially dispensing the containers from the magazine in such manner as to prevent reintroducing dispensing containers back into the dispensing apparatus. The product is thereby safe-guarded against tampering all the way from the factory to the consumer.

While reference has been made to dispensing products such as capsules, tablets and pills, it will be understood that the method and apparatus of the present invention are applicable to the dispensing of any products that are succeptable of tampering. These would include such items as cosmetics chewing gum, candy and all good and drug products.

For maximum security, it is desirable for magazines or cartridges to be sealed at the factory where the products is produced. However, as an interim measure, it is possible to use magazines which can be loaded at the retail establishment. For example, a magazine such as that shown in FIG. 4 can be left open at both ends, top and bottom, whereby it can be left in the housing and loaded from the top upon opening the sliding top 6, which after leading, is closed and locked.

What I claim is:

1. Tamper resistant apparatus for dispensing packaged products comprising:

an upright housing having, in an upper portion of said housing, magazine means for storing a plurality of packages to be dispensed, said housing having side walls and having at an upper end an entrance for introduction of said packages and in a lower portion an exit for discharge of packages, means for closing said entrance and securing means for preventing an unauthorized opening of said entrance closing means, discharge means at said exit for sequentially discharging packages from said exit, said discharge means comprising upper and lower horizontally slidable doors disposed one above the other with a dwell space between said doors, said doors being slidable between open position and closed position, a package delivery station disposed below said lower door and a delivery passage leading from said dwell space to said delivery station, customer operable means for opening and closing said doors to release a package from said magazine means to said delivery passage, said operable means comprising means for coordinating the operation of said doors to close said lower door and open said upper door to permit discharge of a package from said magazine means to said dwell space and then close said upper door and open said lower door to discharge said package from said dwell space to said delivery passage for passage by gravity to said delivery station, and means extending into said delivery passage and below said lower door for preventing passage of a package from said delivery station to said magazine means, said means for coordinating the operation of said upper and lower doors comprising lever means extending between and interconnecting said upper door and said lower door, said lever means being pivoted on a shaft extending between side walls of said housing between said upper door and said lower door.

2. Apparatus according to claim 1, in which said means for preventing passage of a package from said delivery station to said magazine means comprises a pivoted arm extending into said delivery passageway and means for permitting pivoting of said arm in a direction for passage of a package from said dwell space to said delivery station but preventing pivoting of said arm in an opposite direction and thereby preventing passage of a package from said delivery station to said dwell space.

3. Apparatus according to claim 1, in which said means for preventing passage of a package from said delivery station to said magazine means comprises a rotatable member having a plurality of arms extending into said delivery passage and means permitting rotation of said rotatable member in a direction for said arms to permit passage of a package from said dwell space to said delivery station while preventing rotation of said rotatable member in a direction for said arms to permit passage of a package from said delivery station to said dwell space.

4. Apparatus according to claim 1, in which said magazine means comprises a sealed insert insertable into said housing and in which there is provided, in said housing, means for rupturing a seal of said insert to permit discharge of packages from said insert.

5. Apparatus according to claim 4, further comprising mounting means for securing said housing to a support in a manner to prevent its removal by an unauthorized person, said mounting means including means for tilting of said housing about a front lower corner therof to permit tilting of said housing forwardly to a loading position for insertion of said insert.

6. Apparatus according to claim 1, further comprising means for locking said operating means, said locking means including means operable by insertion of a release medium to release said operating means.

7. Tamper resistant apparatus for dispensing packaged products comprising:

an upright housing of rectangular cross section having vertical side walls and having at an upper end an entrance opening, a magazine of rectangular cross section for containing packages to be dispensed, said magazine being of a size and shape to be inserted into said entrance opening of said housing and to fit closely to said housing, said magazine containing packages to be dispensed and being closed at a lower end by tamper-resistant sealing means comprising plastic film sealed over said lower end, means in said housing for opening said sealing means of said magazine upon insertion of said magazine into said housing to thereby permit release of said packages, said opening means comprising means for rupturing said plastic film adjacent side walls of said housing, securing means for preventing unauthorized removal of said magazines from said housing, said housing having in a lower portion thereof a package delivery station, customer operable means for releasing packages sequentially from said magazine and a delivery passage for conducting released packages from said releasing means to said delivery station, and means for preventing reintroduction of packages through said delivery passage into said magazine 8. Apparatus according to claim 7, in which said means for opening said sealing means comprises cutting edges mounted on the inside of walls of said housing for rupturing said plastic film upon insertion of said magazine into said housing.

9. Apparatus according to claim 7, in which said means for releasing said packages sequentially to said package delivery station comprises upper and lower slidable gates disposed one above another with a dwell space between said gates, said gates being slidable between open position and closed position, customer operable means for opening and closing said gates to release a package from said magazine to said delivery station, said operable means comprising means coordinating the operation of said gates to close said lower gate and open said upper gate to permit discharge of a package from said magazine to said dwell space and then to close said upper gate and open said lower gate to discharge said package from said dwell space to said delivery stations.

10. Apparatus according to claim 9, in which said means coordinating the operation of said gates comprises a rack on a lower side of said upper gate, a rack on an upper side of said lower gate and a pinion rotatable about a shaft between said gates, said pinion engaging said rack on the lower side of said upper gate and said rack on said upper side of said lower gate.

11. A method of dispensing ingestible units such as capsules, tablets and pills which comprises, packaging selected plural quantities of said units each of a plurality of sealable, individual containers, sealing said containers, introducing a selected plural number of said sealed containers into a prismatic magazine having integral side walls and bottom and an open top and sealing said magazine by bonding a rupturable plastic sealing film over the top of said magazine at a first location, transporting said sealed magazine to a second location and there inverting said sealed magazine and assembling said magazine while still sealed with dispensing apparatus having a top inlet for receiving said magazine, means for preventing unauthorized removal of said magazine from said dispensing apparatus, means for rupturing said sealing film of said magazine when said magazine is assembled with said apparatus to release said sealed containers to said apparatus, means for sequentially dispensing said sealed containers individually from said apparatus to a delivery station and means for preventing reintroduction of dispensed containers from said delivery station into said dispensing apparatus.

12. A method according to claim 11 further comprising welding a plastic cover on said magazine over said sealing film at said first location and removing said cover at said second location before assembling said magazine with said dispensing apparatus.

* * * * *